BRIGHTNESS CONTROL CIRCUIT FOR TELEVISION RECEIVERS

Filed June 8, 1951

INVENTOR
WALTER H. CHUDLEIGH, JR.
BY
Brown, Denk & Synnestvedt
AGENTS

Patented Sept. 8, 1953

2,651,739

UNITED STATES PATENT OFFICE 2,651,739

BRIGHTNESS CONTROL CIRCUIT FOR TELEVISION RECEIVERS

Walter H. Chudleigh, Jr., Oreland, Pa., assignor to Philco Corporation, Philadelphia, Pa., a corporation of Pennsylvania Application June 8, 1951, Serial No. 230,535

3 Claims. (Cl. 315—22)

Figure 1:
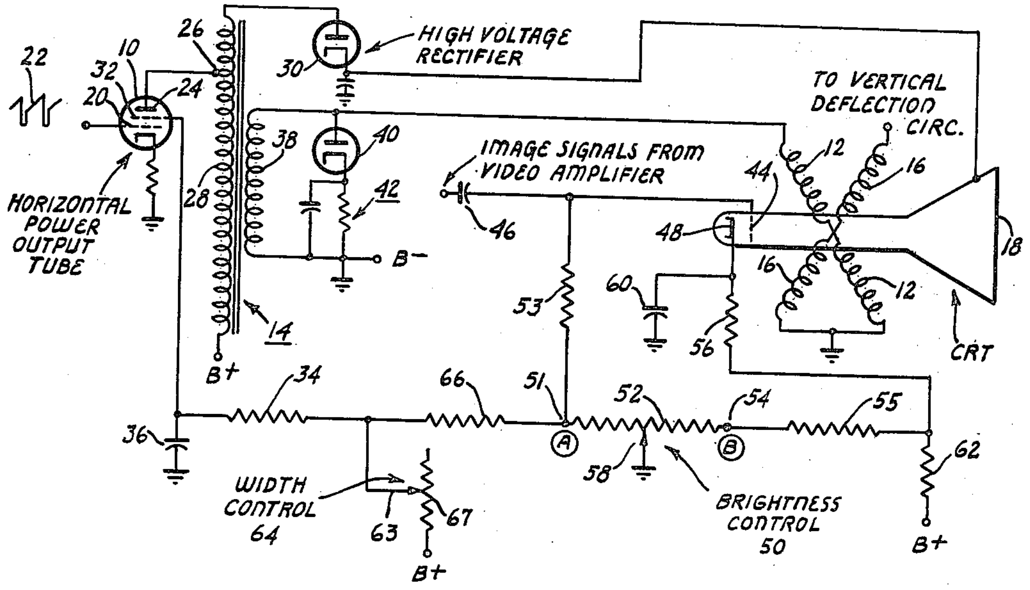

The present invention relates to television receiving systems of the type in which the scanning beam developed by a cathode-ray tube is controlled in such a manner as to effect the electro-optical reproduction of an image. The invention more particularly relates to means for maintaining an image raster of substantially predetermined size and shape in the face of fluctuations in the average intensity of the cathode-ray scanning beam.

The accelerating potential for the second anode of a television receiving tube is commonly derived by rectifying a portion of the energy developed in the horizontal deflection circuit during retrace. For example, one well-known method of obtaining this high voltage is by connecting the rectifying tube across a stepped-up primary winding of the transformer which couples the power output tube to the cathode-ray beam deflection coils. In such an arrangement, however, the high-voltage supply has the disadvantage of relatively poor regulation, one reason for which is set forth below.

The anode circuit of the image reproducing cathode-ray tube constitutes a load, the average impedance of which varies in accordance with the average value of the video signal. As picture brightness decreases, for example, the amount of current drawn from the high-voltage supply decreases, and the impedance of the cathode-ray tube anode circuit increases. Conversely, as the image brightness becomes greater this circuit impedance decreases. Inasmuch as a majority of television receivers are presently manufactured with a manually-adjustable background control, a manipulation of this control to increase the background illumination (for example) results in a drop in the cathode-ray tube anode voltage to bring about a decrease in the velocity of the cathode-ray scanning beam. Since the deflection sensitivity of the latter is dependent in part upon the anode-to-cathode voltage of the image-reproducing tube, such a drop in accelerating voltage would normally be expected to bring about an increase in the width of the reproduced image, inasmuch as the same deflecting field intensity now acts on a lower-velocity scanning beam. Actually, however, the increased drain from the high-voltage supply "loads" the horizontal power output tube to such an extent that its sawtooth deflecting output is correspondingly decreased, and the end result is a picture the width of which remains substantially constant.

However, the above conditions apply only to the horizontal deflecting circuit. With respect to the height of the image, the change in cathode-ray tube second anode potential is not normally accompanied by a change in the amplitude of the vertical deflecting sawtooth, since the latter is usually a function of the magnitude of the relatively stable B+ power supply system of the television receiver. Consequently, the decrease in cathode-ray tube second anode potential acts in conjunction with a substantially constant vertical deflecting sawtooth to effectively increase the height of the picture in an objectionable manner.

This expansion of the image raster area in a vertical direction has been considered by Otto H. Schade in his Patent No. 2,440,787 issued May 4, 1948. In this patent, voltage fluctuations in the output of a surge-type rectifier are utilized to cause similar variations in the charge developed on the condenser of the vertical deflection circuit. Since an increase in cathode-ray tube beam current causes a drop in the output of the rectifier, it similarly causes a decrease in the amplitude of the vertical sawtooth, and hence helps to maintain the image height constant dispite a drop in the accelerating potential value. One limitation of this Schade circuit resides in the fact that the vertical sawtooth generating circuit requires a substantial current, and hence when the output of the high-voltage rectifier is employed to assist in charging the condenser of this circuit it results in an excessively heavy load being placed upon it. Thus its normally poor regulation is made even more so. The wide fluctuations in cathode-ray tube second anode potential which result from the use of such an arrangement have been found to be commercially unacceptable.

A circuit such as set forth in the Schade patent operates upon the principle of automatically producing a change in the amplitude of the vertical deflecting sawtooth to compensate for a fluctuation in the second anode potential of the cathode-ray tube. Although in theory this would act to maintain the picture aspect ratio substantially constant, nevertheless it is not desirable to permit such wide fluctuations in the output of the high-voltage rectifier. Consequently, the present invention has as one of its features the provision of means for maintaining the cathode-ray tube second anode potential substantially constant regardless of changes in the average scanning beam intensity resulting from manually-controlled variations in the background control of the receiver.

This is accomplished, in one embodiment of the invention, by varying the output of the horizontal power tube as a function of manually-controlled changes in the average intensity of the cathode-ray beam. More particularly, the output of the power tube is made to vary as a function of the manual adjustment of the background, or brightness, control of the receiver. Since the second anode potential of the cathode-ray tube is maintained substantially constant by this means, the picture height remains unchanged when the background control is varied, and the picture width likewise does not vary because, although the sawtooth deflecting current of the horizontal power tube would normally tend to have an increased amplitude, nevertheless the "loading" on such power tube as a result of the increased beam current causes the actual horizontal deflecting amplitude to remain substantially unchanged.

One object of the present invention, therefore, is to provide a manually-adjustable background control circuit for television receivers which acts to maintain the second anode potential of the image-reproducing cathode-ray tube substantially constant throughout its range regardless of changes in picture brightness which result from such an adjustment.

A further object of the invention is to provide a background control arrangement for television receivers in which a manual adjustment of such background control acts to produce a compensating variation in the current developed by the horizontal power output tube.

A still further object of the present invention is to provide a television receiver in which the accelerating potential of the image-reproducing tube is maintained substantially constant regardless of manually-controlled variations in the average intensity of the scanning beam.

To the foregoing general ends it is a feature of the invention to provide, in a television receiver of the type in which the accelerating potential for the image-reproducing cathode-ray tube is derived from energy stored during retrace in the electromagnetic horizontal deflection system, the magnitude of such accelerating potential normally being subject to fluctuations as a function of variations in the average intensity of the scanning beam of said cathode-ray tube as the overall brightness of the reproduced image changes, the combination of a manually-operable background control for effecting such changes in the overall brightness of the reproduced image, and a connection between such background control and said horizontal deflection system so that the energy developed in the latter during retrace is caused to vary in accordance with manually-controlled adjustments of the said background control, thereby maintaining substantially constant the said accelerating potential for the cathode-ray tube regardless of changes in the average intensity of the scanning beam.

Figure 2:
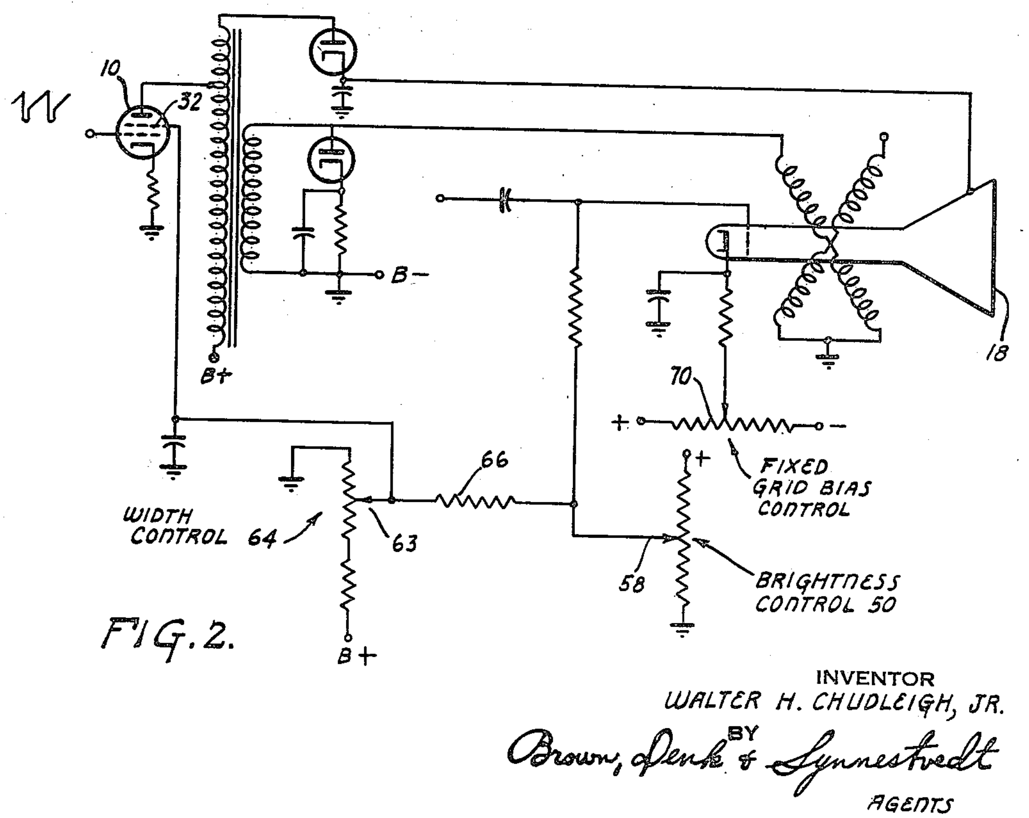

Other objects and advantages will be apparent from the following description of preferred embodiments of the invention and from the drawings, in which:

Figure 1 is a schematic diagram of a television receiver embodying one form of the present invention; and Figure 2 is a modification of the circuit of Figure 1.

Referring first to Figure 1 of the drawings, there is shown a power output tube 10 which is adapted to supply current to a pair of horizontal cathode-ray beam deflecting coils 12 through a coupling transformer generally designated by the reference numeral 14. The horizontal deflecting coils 12, together with a pair of vertical deflecting coils 16, may constitute a conventional yoke encircling the neck of the image-reproducing tube 18. Power tube 10 may be a tetrode, for example, having a control electrode 20 to which is applied a sawtooth voltage variation 22 derived from a preceding portion of the television receiver (not shown). The anode 24 of tube 10 is connected to a tap 26 on the primary winding 28 of the transformer 14. This primary winding 28 is also provided with a stepped-up portion designed to supply energy to the second anode of the cathode-ray tube 18 through a high-voltage rectifier 30 which is connected to operate in a conventional manner. The lower terminal of the primary winding 28 is connected to the usual B+ supply of the receiver as indicated in the drawing. Tube 10 is also provided with a screen electrode 32 which is connected to one terminal of a resistor 34 (the function of which will appear hereinafter) and is by-passed to ground for alternating currents by means of a capacitor 36.

The secondary winding 38 of transformer 14 is connected in shunt with the horizontal deflecting coils 12, and likewise across the series combination of a damper tube 40 and an RC network 42. The elements 40 and 42 are arranged in a conventional manner to damp out the high-frequency oscillations which would normally occur in the secondary circuit of the transformer 14 following the retrace portion of each deflection cycle. Since the operation of damper tube 40 is well known in the art and forms no part of the present invention, no further description thereof will be given.

The cathode-ray tube 18 is provided with a control electrode 44 to which image signals are applied through a capacitor 46. These image signals may be derived, for example, from a video amplifier forming part of the television receiver. The tube 18 is likewise provided with a cathode 48 which forms part of the electron gun for developing the cathode-ray scanning beam. Between the control grid 44 and the cathode 48 of tube 18 is connected a potentiometer 50, which serves as a manually-adjustable brightness control for the television receiver. This potentiometer 50 has one end 51 of its resistance element 52 connected to the CRT control grid 44 through a resistor 53, the other terminal 54 of such resistance element 52 being connected through two resistors 55 and 56 to the tube cathode 48. The adjustable wiper element 58 of the potentiometer is grounded as illustrated. A bypass condenser 60 is connected to the cathode 48 in order to avoid degeneration of the video signal.

The terminal 54 of the potentiometer 50 is joined to the B+ operating potential source of the television receiver through the resistor 55 and a further resistor 62. The remaining terminal 51 of potentiometer 50 is connected to the wiper element 63 of a further potentiometer 64 through a resistor 66. The potentiometer 64 acts as a width control for the cathode-ray tube 18, and has one terminal of its resistance element 67 connected to the B+ operating potential source.

The brightness control potentiometer 50 acts to vary the bias established between the control electrode 44 of the cathode-ray tube 18 and its cathode 48. As will be observed from the drawing, movement of the wiper element 58 to the left (or in the direction of point A) will raise the positive potential at the terminal 54 of the resistance element 50 (point B) and lower the positive potential at point A. This makes the tube cathode 48 more positive with respect to the grid 44 and reduces the scanning beam intensity. Conversely, a movement of the wiper element 58 to the right (or toward point B) lowers the positive potential of cathode 48 relative to the grid 44. This raising of the positive voltage on grid 44 relative to the cathode 48 increases the beam current of tube 18 to correspondingly increase the average brightness of the image. Thus the potentiometer 50 acts to regulate the average scanning beam intensity.

Turning now to the operation of the width control 64, it will be seen that adjustment of this control acts to vary the magnitude of the D.-C. potential applied to the screen electrode 32 of the horizontal power output tube 10. This results from the connection of the wiper element 63 of the potentiometer 64 to the screen electrode 32 through the resistor 34. Consequently, the positive voltage on the screen electrode 32 changes as a direct function of variations in the setting of potentiometer 64.

As brought out above, however, the present invention provides means whereby a variation in the setting of the brightness control 50 (so as to change the beam intensity of tube 18) acts to maintain a substantially constant output from the high voltage rectifier 30. As also brought out above, this is accomplished by varying (for example) the output of the power tube 10 so that, even though a greater drain is placed upon the rectifier 30, this is compensated for by a greater output of "kick-back" energy from the transformer 14. This result obtains by virtue of the fact that, as the position of the wiper element 58 of brightness control 50 is varied, the total resistance between wiper 63 of width control potentiometer 64 and ground is caused to vary, which in turn is effective to vary the potential applied to the screen grid 32 of tube 10 and thereby vary its output. Thus, if wiper 58 is moved toward point B to increase the beam current of cathode-ray tube 18, the total resistance between wiper 63 and ground will be increased and this will increase the positive potential applied to the screen electrode 32 of tube 10. Conversely, a controlled decrease in beam current of the cathode-ray tube 18 by a movement of the wiper element 58 toward point A in Figure 1 will decrease the positive potential at terminal 51. This will cause the operating bias on the screen electrode 32 of tube 10 to become less positive, and hence reduce the output of the tube in proportion to the reduction in intensity of the cathode-ray scanning beam. It is of course necessary that the particular values of resistance used for the components of the circuit be selected so that a proper compensating effect is brought about. It has been found in practice that suitable values for certain of the components in Figure 1 may be as given below, although it will be appreciated that these may be varied as may be desirable or necessary to correlate them with the components used in the remainder of the circuit:

| | Ohms |
|---|---|
| Potentiometer 50 | 10,000 |
| Resistor 56 | 120,000 |
| Resistor 55 | 22,000 |
| Resistor 62 | 82,000 |
| Potentiometer 64 | 20,000 |
| Resistor 34 | 10,000 |
| Resistor 66 | 10,000 |
| Resistor 53 | 470,000 |

In Figure 2 is shown a modification of Figure 1 in which a separate fixed grid bias control 70 is employed in conjunction with the brightness control potentiometer 50. This permits a more precise determination of the operating bias of the cathode-ray tube 18, since the potentiometer 50 now acts as a vernier adjustment. The fixed grid bias control 70 might, for example, be a screwdriver regulation placed on the rear portion of the chassis, and pre-set to a desired value when the receiver is installed. The brightness control 50, however, would, as in the case of Figure 1, be a manually-operative front panel knob to enable the observer to select the degree of brightness most suitable for the image being viewed. As in the case of the embodiment of Figure 1, variation in the adjustment of brightness control 50 operates to vary the total resistance between wiper 63 of width control 64 and ground and is thereby effective to vary the magnitude of the positive potential applied to the screen grid 32 of tube 10. While the circuit of Figure 2 permits a high degree of compensation, it has been found in practice that the slightly lower range over which the circuit in Figure 1 is effective is usually satisfactory and hence may be preferred since it requires only one potentiometer adjustment whereas the circuit of Figure 2 requires two.

While I have described my invention by means of specific examples and specific embodiments, I do not wish to be limited thereto, for obvious modifications will occur to those skilled in the art without departing from the spirit and scope of the invention. For example, in the embodiments of either Figure 1 or Figure 2, the electrical connection between brightness control 50 and width control 64 through resistor 66 may be omitted, and, in lieu thereof, the brightness control potentiometer 50 may be mechanically ganged to a further potentiometer connected in parallel with the width control 64. This will provide the desired variation in screen grid potential of output tube 10 when the brightness control 50 is varied.

Having thus described my invention, I claim:

1. In a television receiver; a cathode-ray image-reproducing tube; beam-deflecting elements associated with said cathode-ray tube; means, including an amplifier tube, for applying beam-deflecting signals to said beam-deflecting elements; means for rectifying at least a portion of the output of said amplifier tube; means for applying said rectified output to a beam-accelerating electrode of said cathode-ray tube, said rectified output and said beam-deflecting signals being thereby subject to variations in response to variations in the intensity of the beam in said cathode-ray image-reproducing tube; a D.-C. path of substantial resistance connecting two points of substantially different potential; a connection from a first point on said resistive path to a beam-intensity control electrode of said cathode-ray tube; manually adjustable means for varying the resistance of said D.-C. path to vary the potential at said first point, thereby to vary the potential of said beam-intensity control electrode; and a connection from a second point on said resistive path to a space-current control electrode of said amplifier tube, whereby, when said adjustable means is adjusted to vary the intensity of said cathode-ray beam, the potential of said space-current control electrode is concurrently varied.

2. In a television receiver; a cathode-ray image-reproducing tube; beam-deflecting elements associated with said cathode-ray tube; means, including an amplifier tube, for applying horizontal-deflecting signals to said beam-deflecting elements; means for rectifying at least a portion of the output of said amplifier tube; means for applying said rectified output to a beam-accelerating electrode of said cathode-ray tube, said rectified output and said horizontal-deflecting signals being thereby subject to variations in response to variations in the intensity of the beam in said cathode-ray image-reproducing tube; a D.-C. path of substantial resistance connecting two terminal points having substantially different potentials; a connection from a first intermediate point on said resistive path to a beam-intensity control electrode of said cathode-ray tube; manually adjustable means for varying the resistance of said D.-C. path to vary the potential at said first intermediate point, thereby to vary the potential of said beam-intensity control electrode; and a connection from a second intermediate point on said resistive path to a space-current control electrode of said amplifier tube, whereby, when said adjustable means is adjusted to vary the intensity of said cathode-ray beam, the potential of said space-current control electrode is concurrently varied.

3. Apparatus as claimed in claim 2 characterized by the fact that said connection from said second intermediate point is manually adjustable on said resistive path, thereby to vary the width of the reproduced image.

WALTER H. CHUDLEIGH, JR.

References Cited in the file of this patent

UNITED STATES PATENTS

| Number | Name | Date |
|---|---|---|
| 2,302,876 | Malling | Nov. 24, 1942 |
| 2,371,897 | Knick | Mar. 20, 1945 |
| 2,440,787 | Schade | May 4, 1948 |
| 2,454,150 | Fredendall | Nov. 16, 1948 |

FOREIGN PATENTS

| Number | Country | Date |
|---|---|---|
| 594,358 | Great Britain | Nov. 10, 1947 |